US008356175B2

(12) United States Patent
Smith et al.

(10) Patent No.: US 8,356,175 B2
(45) Date of Patent: Jan. 15, 2013

(54) METHODS AND APPARATUS TO PERFORM ASSOCIATED SECURITY PROTOCOL EXTENSIONS

(75) Inventors: Ned Smith, Beaverton, OR (US); Rajan S. Palanivel, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1931 days.

(21) Appl. No.: 11/170,528

(22) Filed: Jun. 29, 2005

(65) Prior Publication Data

US 2007/0003063 A1 Jan. 4, 2007

(51) Int. Cl.
*H04L 29/06* (2006.01)
(52) U.S. Cl. .......................................... 713/168; 380/44
(58) Field of Classification Search ................... 713/168, 713/169, 171, 157, 170, 150; 380/44, 45, 380/283, 284, 259, 260
See application file for complete search history.

(56) References Cited

U.S. PATENT DOCUMENTS

| | | | | |
|---|---|---|---|---|
| 6,718,467 B1 * | 4/2004 | Trostle | ........................... | 713/171 |
| 6,987,855 B1 * | 1/2006 | Srivastava | ..................... | 380/278 |
| 2002/0129236 A1 | 9/2002 | Nuutinen | | |
| 2002/0178360 A1 * | 11/2002 | Wenocur et al. | ............... | 713/170 |
| 2003/0081785 A1 * | 5/2003 | Boneh et al. | ................... | 380/277 |
| 2005/0074122 A1 * | 4/2005 | Fascenda | ....................... | 380/258 |
| 2005/0166051 A1 * | 7/2005 | Buer | ............................ | 713/173 |
| 2005/0210251 A1 | 9/2005 | Nyberg et al. | | |
| 2007/0199071 A1 * | 8/2007 | Callas | ............................ | 726/26 |

FOREIGN PATENT DOCUMENTS

| | | |
|---|---|---|
| EP | 0861011 A2 | 8/1998 |
| WO | WO 0002406 A2 | 1/2000 |
| WO | WO 2004/028071 A1 | 4/2004 |

OTHER PUBLICATIONS

U.S. Appl. No. 10/808,973, filed Mar. 24, 2004, Ned M. Smith.

* cited by examiner

*Primary Examiner* — Edward Zee
(74) *Attorney, Agent, or Firm* — Hanley, Flight & Zimmerman, LLC

(57) ABSTRACT

Methods and apparatus to perform associated extensions for negotiated channel security protocols are disclosed. A disclosed method to extend a security protocol comprises exchanging identifying information between a first and a second endpoint, determining a secret based on the exchanged identifying information, determining a first master secret based on the determined secret and a second master secret determined in a prior protocol exchange block, and deriving a session key based on the first master secret.

21 Claims, 8 Drawing Sheets

METHODS AND APPARATUS TO PERFORM ASSOCIATED SECURITY PROTOCOL EXTENSIONS

FIELD OF THE DISCLOSURE

This disclosure relates generally to negotiated channel security protocols, and, more particularly, to methods and apparatus to perform associated extensions for negotiated channel security protocols.

BACKGROUND

Traditional security protocols (e.g., Secure Sockets Layer (SSL), Transport Layer Security (TLS), Internet Key Exchange (IKE), etc.) negotiate session keys that are authenticated using digital certificates, keys, or shared secrets (e.g., a pass phrase). The session keys are used to encrypt and decrypt subsequent communications carried across a secured channel.

FIGS. 1A-B illustrate an example prior-art authentication sequence (i.e., an authentication protocol encapsulation block (PEB)) executed between two endpoints A and B to negotiate (i.e., derive) session keys. Endpoints A and B are one of a variety of computing devices or platforms (e.g., a computer, a server, a personal digital assistant (PDA), a cellular phone, an Internet kiosk, etc.) connected together, for example, by a computer network, a bus, a wireless communication link, a serial channel, etc. The endpoints A and B may communicate in a master-slave, a client-server, or a peer-to-peer configuration.

The example authentication PEB of FIGS. 1A-B begins with endpoints A and B exchanging authentication attributes (i.e., identifying information) (block 102 of FIG. 1A). The exchanged attributes (e.g., public keys, digital signatures, certificates, attestation information, etc.) allow an endpoint to authenticate information received from the other endpoint. For example, endpoint A encrypts (or digitally signs) an attribute (e.g., attestation information) using a private key (that is only known to endpoint A) and sends the encrypted attribute and a public key (that corresponds to the private key which remains known only to endpoint A) to endpoint B.

Next, using received authentication attributes (e.g., public keys), the endpoints A and B authenticate the received attributes (block 104). For example, endpoint B uses the public key (received from endpoint A) to decrypt the received encrypted attribute (e.g., attestation information). If the decryption is successful, endpoint B knows that the received attribute is authentic (i.e., sent by endpoint A).

In the example authentication PEB of FIG. 1A, endpoint A then generates a high entropy random number (i.e., nonce$^A$), digitally signs nonce$^A$ (using a private key of endpoint A), encrypts the signed nonce$^A$ (using a public key of endpoint B), and sends the encrypted and signed nonce to endpoint B (block 106). Endpoint B then decrypts and authenticates (using a private key of endpoint B, and a public key of endpoint A) the received nonce$^A$ (block 108). Endpoint B then generates a second high entropy random number (i.e., nonce$^B$), creates a cryptographic combination (e.g., arithmetic addition, exclusive-or, hash, etc.) of nonce$^A$ and nonce$^B$, signs and encrypts the nonce combination, and sends the encrypted and signed nonce combination to endpoint A (block 110). Endpoint A authenticates the received nonce combination (block 112) and sends an encrypted and signed version of nonce$^B$ back to endpoint B (block 114).

The example authentication PEB continues with block 120 of FIG. 1B. The endpoints A and B determine a master secret from nonce$^A$ and nonce$^B$. For example, the master secret may be determined using a cryptographic combination of nonce$^A$, nonce$^B$, and a cryptographic hash of the handshake messages (i.e., exchanged identifying information or authentication attributes) (block 120). Using one of a variety of techniques (e.g., "Deriving Keys for use with Microsoft Point-to-Point Encryption (MPPE)", Internet Engineering Task Force (IETF) Request for Comment (RFC) 3079, March 2001), session keys are derived from the master secret (block 122). By exchanging and basing session keys on nonce$^A$ and nonce$^B$, the authentication PEB of FIGS. 1A-B reduces the risk of replay attacks, man-in-the-middle attacks, etc.

Using techniques similar to those discussed above, the endpoints A and B exchange some initial data (block 124). Each endpoint A and B then determines if the received data is valid (e.g., decrypted correctly) (block 126). If the received data is valid (block 126), the session is authenticated and secure communications can proceed using the established session (block 128). Otherwise, the session is not authenticated, and, thus, secure communication can not properly proceed using the new session (block 130).

DETAILED DESCRIPTION

Traditionally, an authentication PEB (e.g., a network access authentication based on the version of anti-virus definitions installed, client configuration status information, and/or attestation information) executed subsequent to a previous authentication PEB is executed independently of the previous authentication PEB. That is, subsequent authentications do not derive their session keys based on information available (e.g., identifying information, a master secret) from a previous PEB. As such, the continuity of authentication, authorization, integrity and attack prevention semantics is not preserved through a chain of authentication and authorization PEBs.

The management of platform and user identities in next generation enterprise topologies, where ad-hoc enterprise environments are created in non-traditional locations (e.g., hotels, other companies, public gathering places, via public networks, etc.), will require enhanced security frameworks. A key element of those security frameworks will be the ability to carry forward identity authentication information (i.e., associated protocol extensions) through a chain of authentication and authorization PEBs.

Figure 2:
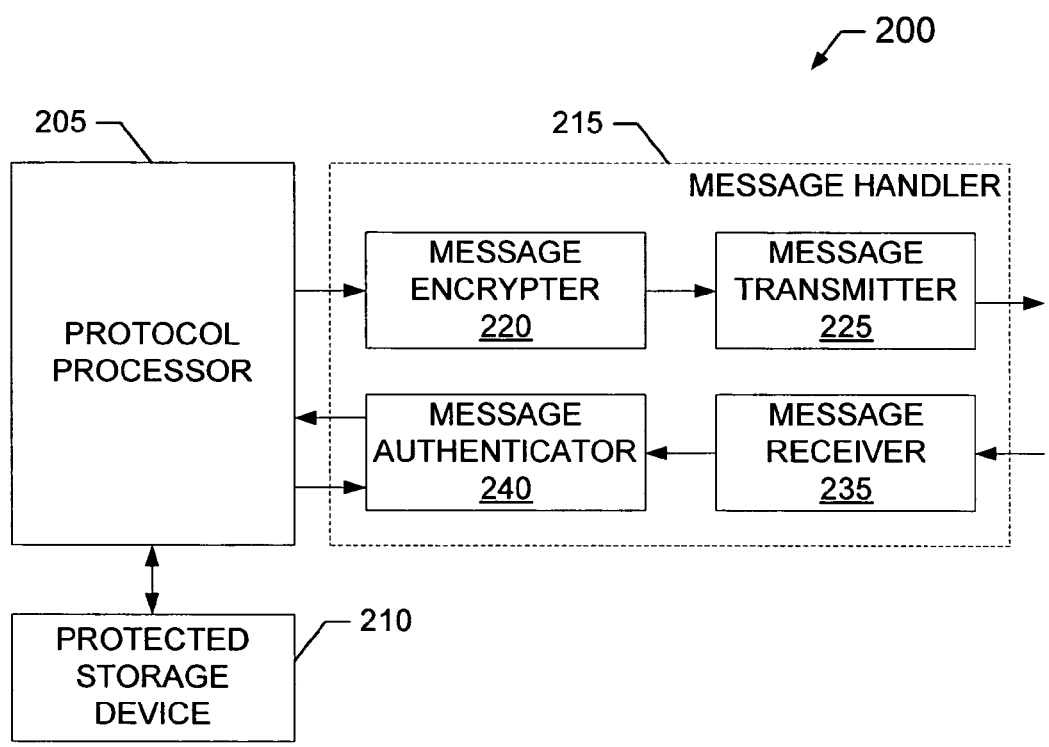
FIG. 2 is a schematic illustration of an example security protocol extender constructed in accordance with the teachings of the invention.

FIG. 2 is a schematic illustration of an example security protocol extender (SPE) 200 constructed in accordance with the teachings of the invention. The SPE 200 may be a part, or all, of a protocol endpoint. To associate an authentication PEB with a previous authentication PEB and to extend a previously established and authenticated identification, the SPE 200 includes a protocol processor 205, a protected storage device 210, and a message handler 215. The protocol processor 205 is one of a variety of processors or computing devices capable of executing PEBs. For example, the protocol processor 205 could be a general purpose Intel® processor or an Intel® Active Management Technology (AMT) engine.

To transmit encrypted and/or digitally signed information (i.e., messages, packets, etc.), the message handler 215 includes a message encrypter 220, and a message transmitter 225. The message encrypter 220 receives from the protocol processor 205 information to encrypt and/or digitally sign, and encryption keys (stored in the protected storage device 210). The message encrypter 220 encrypts and/or digitally signs the provided information and provides the encrypted and/or digitally signed message to the message transmitter 225. The message transmitter 225 transmits the encrypted and/or digitally signed message to another endpoint across, for example, a computer network, a bus, a wireless communication link, a serial channel, etc.

To receive and authenticate encrypted and/or digitally signed messages, the message handler 215 includes a message receiver 235, and a message authenticator 240. The message receiver 235 receives messages from another endpoint across, for example, a computer network, a bus, a wireless communication link, a serial channel, etc. The message authenticator 240 decrypts and/or authenticates (using keys provided by the protocol processor 205) the received messages. In addition to the decrypted and/or authenticated messages, the message authenticator 240 provides to the protocol processor 205 an authentication status (e.g., authentic or not authentic) for received messages.

The protected storage device 210 stores identifying information, certificates, private keys, etc. exchanged during authentication PEBs, the master secret from previous authentication PEBs, and the current sets of exchanged public and session key(s). The contents of the protected storage device 210 are only accessible to the protocol processor 205. The protected storage device 210 can be implemented using any variety of random access memory (RAM). Alternatively, all, or a portion, of the protected storage device 210 could be implemented by a Trusted Platform Module (TPM). The TPM may, for example, contain a platform identity that is registered with a public registration agent who then issues a platform identity credential.

Figure 3:
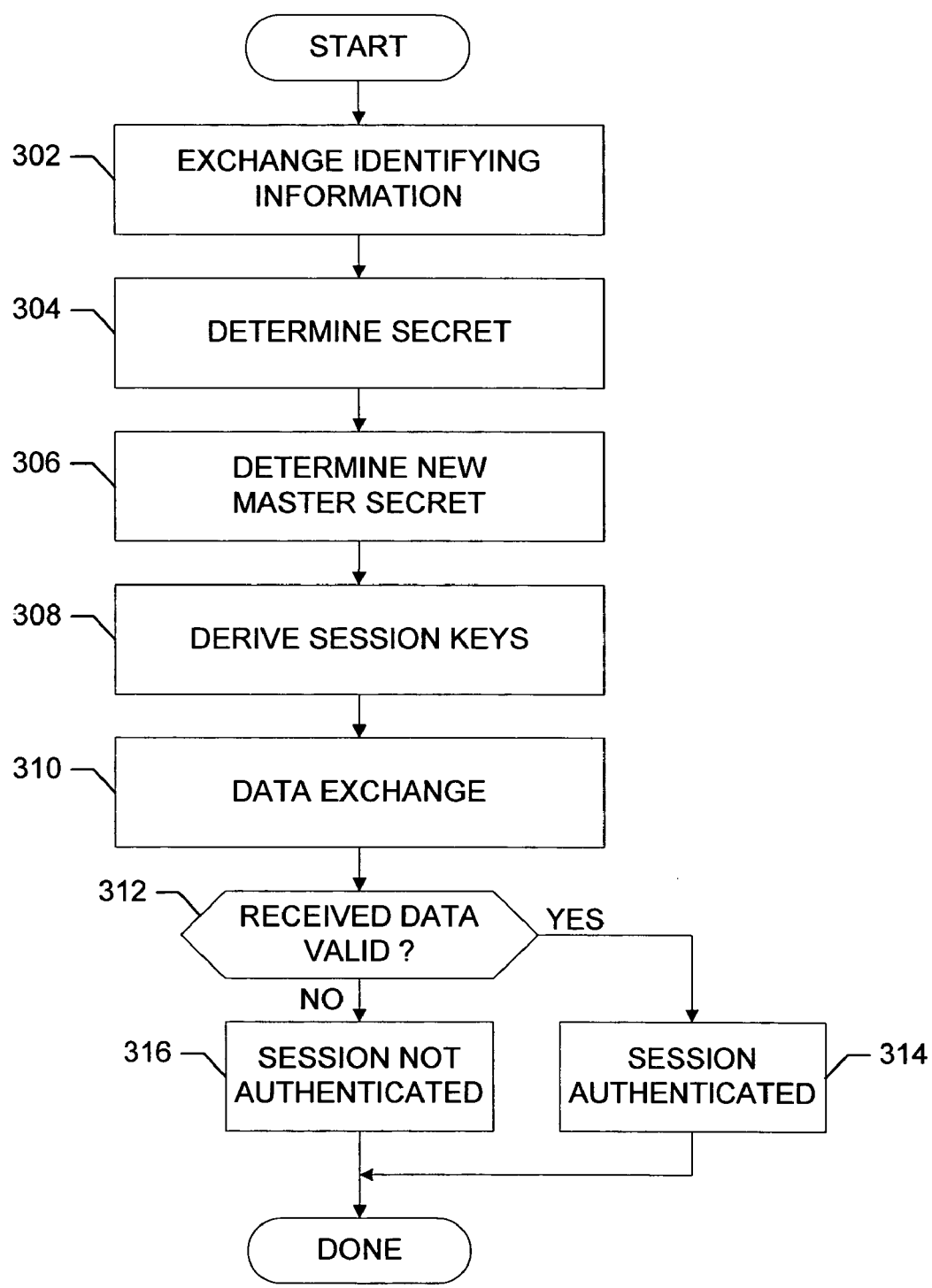
FIG. 3 is a flowchart representative of example machine readable instructions which may be executed to implement the security protocol extender of FIG. 2.

FIG. 3 illustrates a flowchart representative of example machine readable instructions that may be executed by a processor (e.g., the processor 810 of FIG. 8) to implement the example SPE 200 of FIG. 2. The machine readable instructions of FIG. 3, the example SPE 200, the protocol processor 205, the message handler 215, and/or the protected storage device 210 may be executed by a processor, a controller, or any other suitable processing device. For example, the machine readable instructions of FIG. 3, the example SPE 200, the protocol processor 205, the message handler 215, and/or the protected storage device 210 may be embodied in coded instructions stored on a tangible medium such as a flash memory, or RAM associated with the processor 810 shown in the example processor platform 800 discussed below in conjunction with FIG. 8. Alternatively, some or all of the machine readable instructions of FIG. 3, the example SPE 200, the protocol processor 205, the message handler 215, and/or the protected storage device 210 may be implemented using an application specific integrated circuit (ASIC), a programmable logic device (PLD), a field programmable logic device (FPLD), discrete logic, etc. Also, some or all of the machine readable instructions of FIG. 3, the example SPE 200, the protocol processor 205, the message handler 215, and/or the protected storage device 210 may be implemented manually or as combinations of any of the foregoing techniques. Further, although the example machine readable instructions of FIG. 3 are described with reference to the flowchart of FIG. 3, persons of ordinary skill in the art will readily appreciate that many other methods of implementing the example SPE 200, the protocol processor 205, the message handler 215, and/or the protected storage device 210 exist. For example, the order of execution of the blocks may be changed, and/or some of the blocks described may be changed, eliminated, or combined.

Figure 1A:
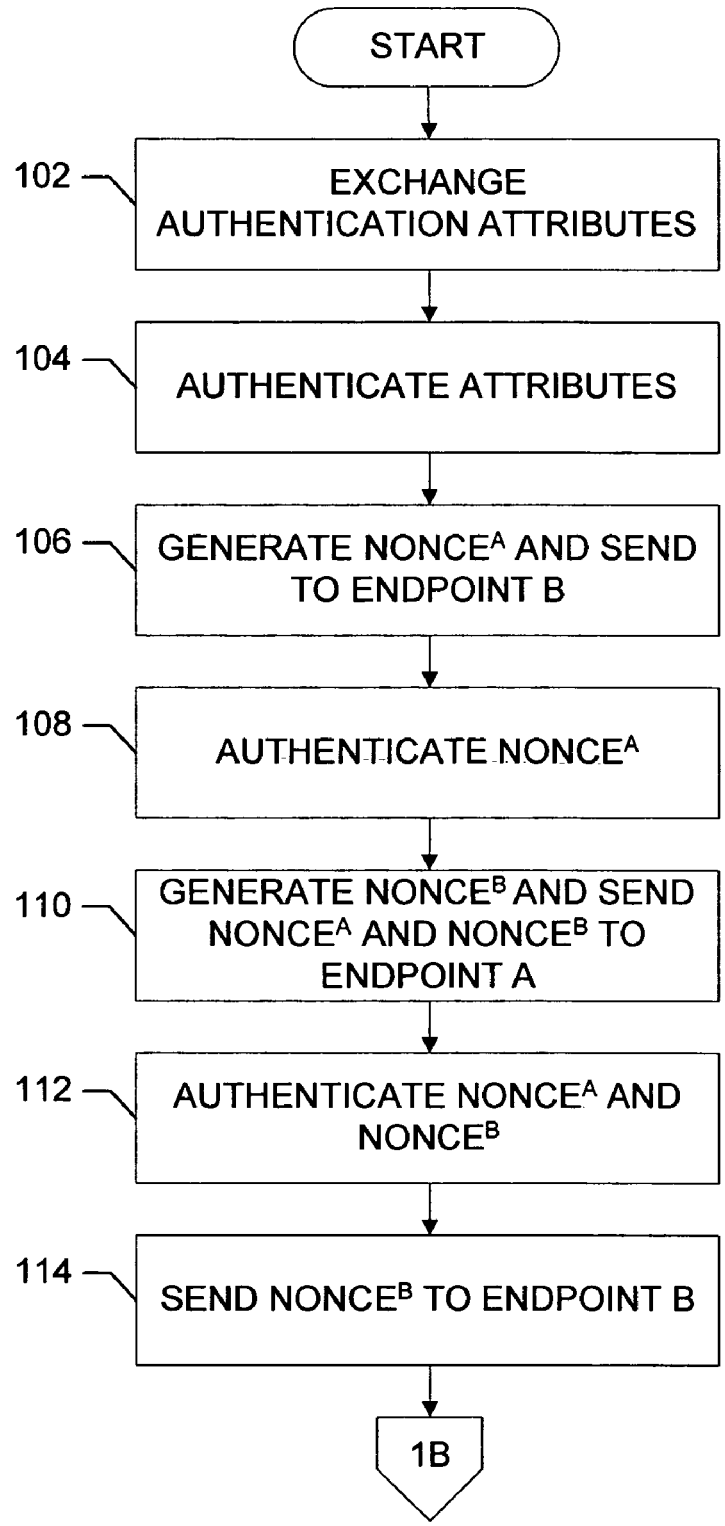
FIGS. 1A and 1B illustrates an example prior-art authentication protocol exchange block.
Figure 1B:
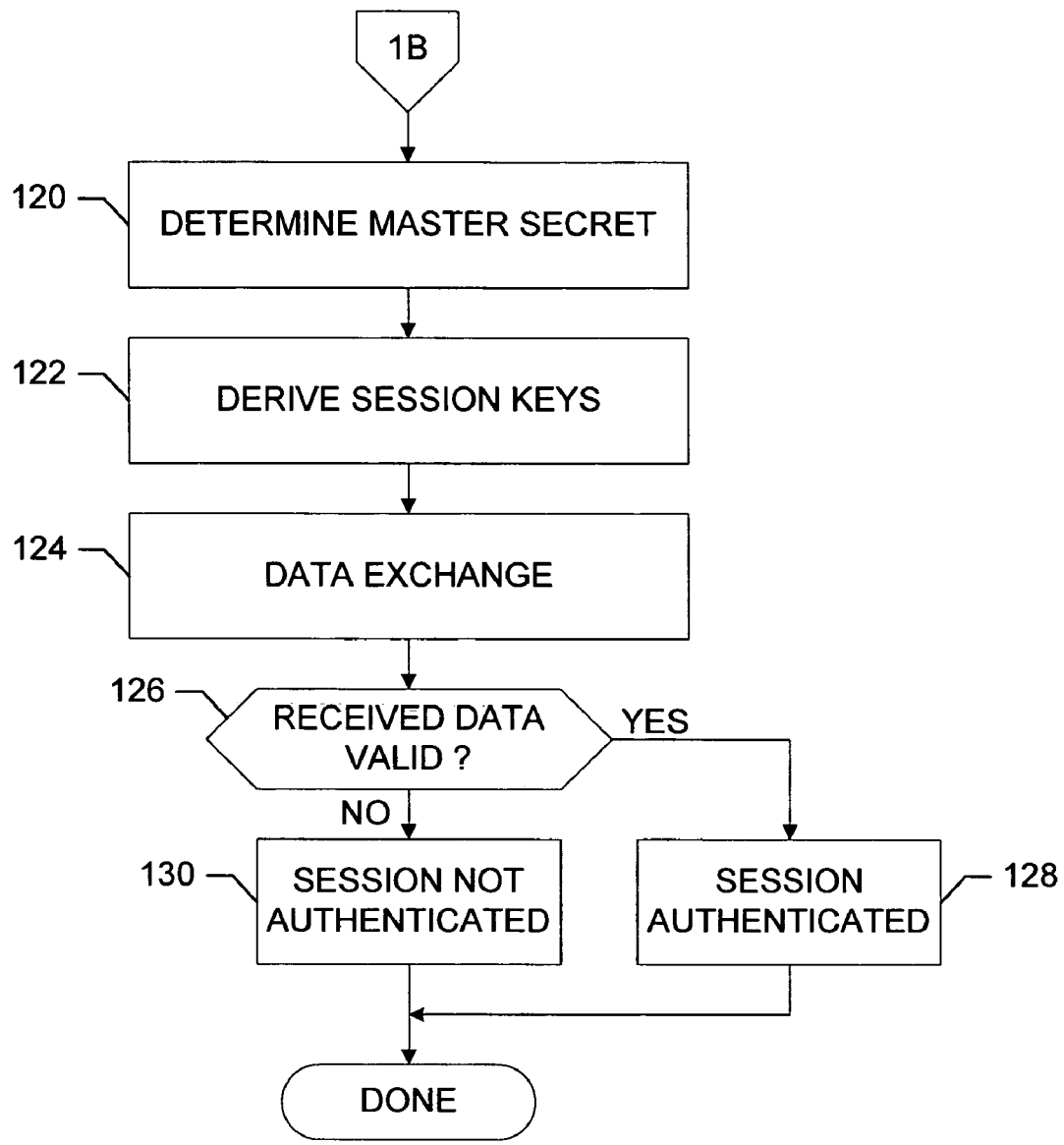

Prior to the start of the example machine readable instructions of FIG. 3, the SPE 200 (e.g., endpoint A) has established a secure channel (i.e., a secure communications link) to another endpoint B, by, for example, using the example authentication PEB illustrated in FIGS. 1A-B, TLS, Internet Protocol Security (IPSEC), Institute of Electrical and Electronics Engineers (IEEE) 802.11i, IEEE 802.11EC, etc.

The example machine readable instructions of FIG. 3 begin when SPE 200 starts a new authentication PEB by exchanging information (e.g., attestation information, identification, credentials, etc.) with the endpoint B (block 302). Based upon the exchanged information, the SPE 200 determines a secret (block 304) from the exchanged information. For example, the secret can be created as a cryptographic hash (e.g., Secure Hash Algorithm—Version 1.0 (SHA-1)) of the exchanged information. Then, the SPE 200 determines a new master secret (block 306). For example, the new master secret is determined by applying a privacy randomization function (PRF) to the current master secret and the determined secret. The PRF can be any appropriate cryptographic combination (e.g., arithmetic addition, exclusive-or cryptographic hash, etc.).

Next, using one of a variety of techniques (e.g., IETF RFC 3079), the SPE 200 derives session keys (i.e., re-keys the session) based on the new master secret (block 308). Using techniques similar to those discussed above, the SPE 200 exchanges data with the other endpoint (block 310). The exchanged data can be, for example, user data to be carried across the new secure session, or identifying information being exchanged as part of a subsequent authentication or authorization PEB. The SPE 200 then determines if received data is valid (e.g., decrypted correctly, valid signature, authentic, etc.) (block 312). If the received data is valid (block 312), the session is authenticated and secure communications can proceed between the SPE 200 and the other endpoint using the established session (block 314). Otherwise, the session is not authenticated, and, thus, secure communication can not properly proceed using the new session (block 316). Finally, the SPE 200 ends the example machine readable instructions of FIG. 3.

Figure 4:
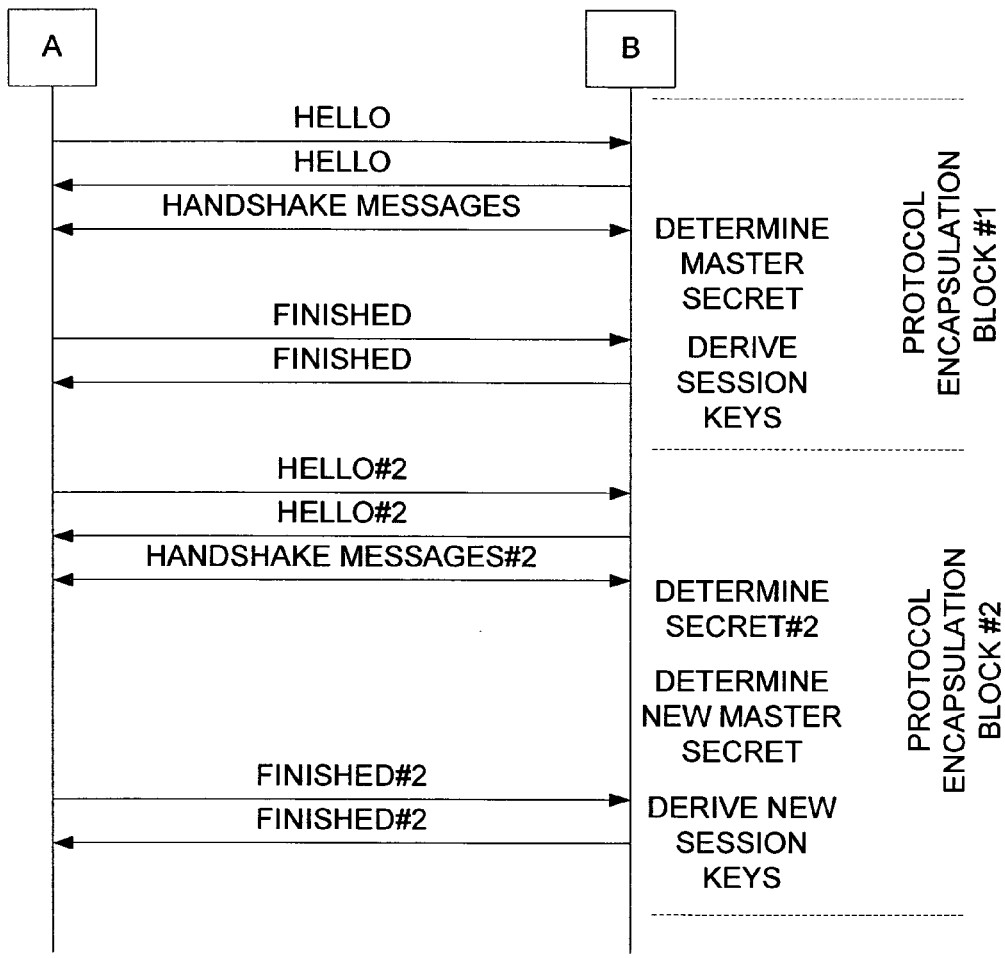
FIGS. 4, 5 and 6 are example illustrations of associated protocol extensions resulting from the execution of the example machine readable instructions of FIG. 3.

FIG. 4 is an example illustration of associated protocol extensions resulting from the execution of the example machine readable instructions of FIG. 3. Two PEBs are illustrated in FIG. 4. The first (i.e., phase1 or outer) PEB establishes a secure channel between the SPE 200 (i.e., endpoint A) and another endpoint B. In the second (i.e., phase2 or inner) PEB, the SPE 200 exchanges second handshake messages (e.g., attestation information, identification, credentials, etc.) with the endpoint B. Based on the second handshake messages, the SPE 200 determines a secret. Then, based on the determined secret and the master secret from the first PEB, the SPE 200 determines a new master secret. Finally, the SPE 200 derives new session keys (i.e., re-keys the session) based on the new master secret. Because, the second PEB is linked (i.e., associated) to the first PEB (by basing the new session keys on the previous master secret), the security protocol has been extended from the first PEB into the second PEB.

It will be readily apparent to persons of ordinary skill in the art that the example machine readable instructions of FIG. 3 can be repeated, without limit, to extend the security authentication with the first and second PEBs into additional PEBs. For example, a third PEB can be associated to and extended from the second PEB, which itself was associated to and extended from the first PEB.

It will also be readily apparent to persons of ordinary skill in the art that some authentication or authorization PEBs are not intended to result in a new master secret and/or session keys. In this case, the SPE 200 can skip or omit example machine readable instructions associated with one or more of the blocks 304-316 of FIG. 3. However, the identifying information exchanged during the PEB can be incorporated into subsequent authentication or authorization PEBs. In one example, a first PEB (i.e., PEB0) establishes a first secure communication session. A second PEB (i.e., PEB1), by design, only results in exchanged identifying information. A third PEB (i.e., PEB2) then exchanges identifying information and establishes a second secure communication session. The new master secret determined in PEB2 can be based on the master secret from PEB0, the exchanged information from PEB1, and the exchanged information from PEB2. Thus, the second secure communication established during PEB2 is associated to and extended from both PEB0 and PEB1.

Figure 5:
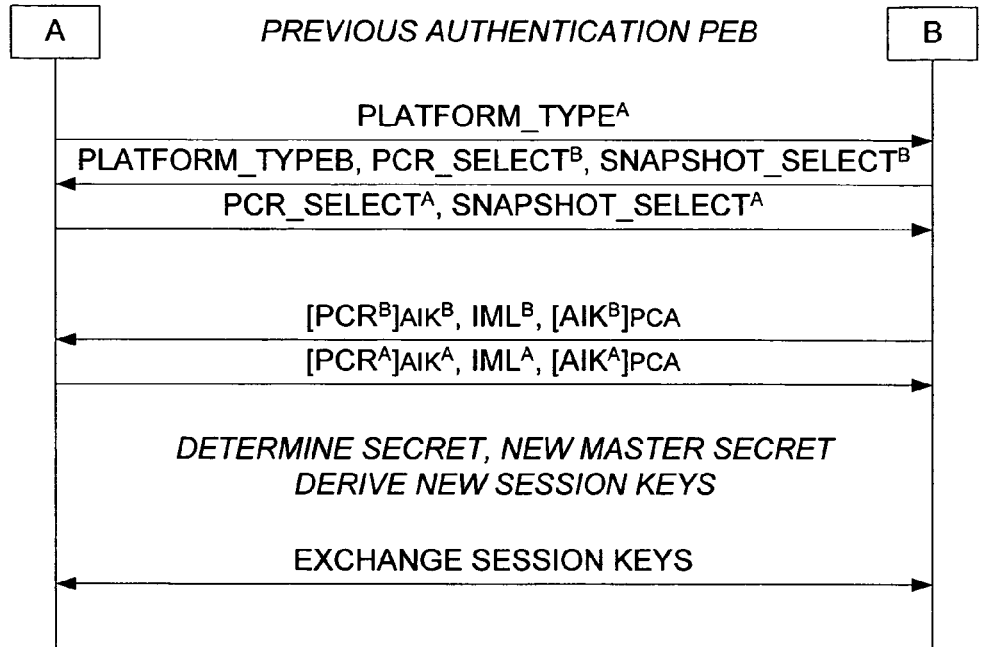
Figure 6:
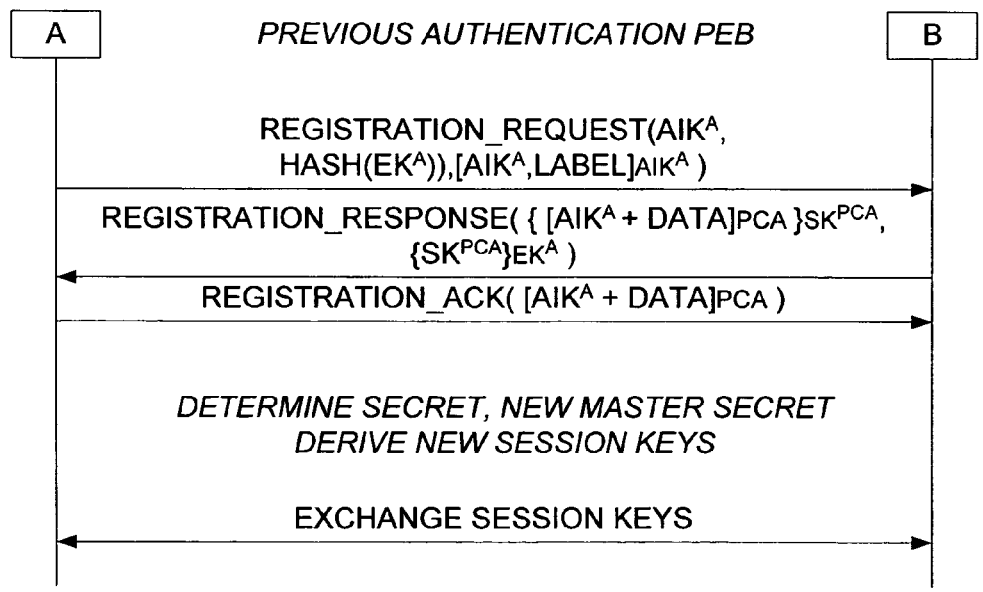

It will also be readily apparent to persons of ordinary skill in the art that the additional PEBs can realize a variety of authentication functions. For example, the additional PEBS realize a platform attestation or an attestation key registry (e.g., registering a TPM) as illustrated by the example PEBs of FIGS. 5 and 6, respectively. In the examples of FIGS. 5 and 6, the following notations and abbreviations are utilized:

[$MSG^A$]$KEY^B$—indicates that the message MSG (created by endpoint A) is digitally signed (using the public key KEY of endpoint B).

{$MSG^A$}$KEY^A$—indicates that the message MSG (created by endpoint A) is encrypted (using the private key KEY of endpoint A).

PCR—platform configuration register (e.g., a register in a TPM)

AIK—Attestation Identity Key (asymmetric)

IML—Integrity Measurement Log

PCA—Platform Certificate Authority

EK—Endorsement Key (asymmetric)

SK—temporal Symmetric Key

The example platform attestation PEB of FIG. 5 relies on a separate (i.e., outer) PEB to establish a secure session between the SPE 200 (i.e., endpoint A) and an endpoint B. However, the PCR values in the example of FIG. 5 are signed by AIK, to authenticate that the configuration data (contained in the PCR) is associated with the platform or device (that includes the SPE 200), since it may not have been previously certified that the outer PEB is tied to the same platform as the PCR. For a similar reason, the information exchanged in the example of FIG. 6 is signed using an AIK or PCA.

Protocol endpoint migrations are valuable in Internet services, where one Internet service vectors a secure connection to another Internet service. The methods and apparatus discussed above can also be used to reliably migrate a protocol endpoint (e.g., from endpoint B to C). Endpoint migrations require the mutual agreement of the current endpoints (e.g., the SPE 200 (i.e., endpoint A) and the endpoint B). Normally, an endpoint migration is requested by the endpoint not being migrated (e.g., endpoint A). However, an endpoint migration can be requested by either endpoint (e.g., endpoint A or B).

By applying the methods discussed above to perform endpoint migration, the security attributes of the new connection (e.g., between endpoints A and C) are associated to and extended from the previously established secure connection (e.g., between endpoints A and B). Thus, the endpoint migration retains unambiguous endpoint identification and retains knowledge of the vectoring endpoint (i.e., endpoint B). This retained additional security context permits policy controlled vectoring with an organization. The benefits of policy controlled vectoring include autonomic enterprise connections, worm propagation mitigation, improved forensic history for tracking network intruders, etc.

Figure 7:
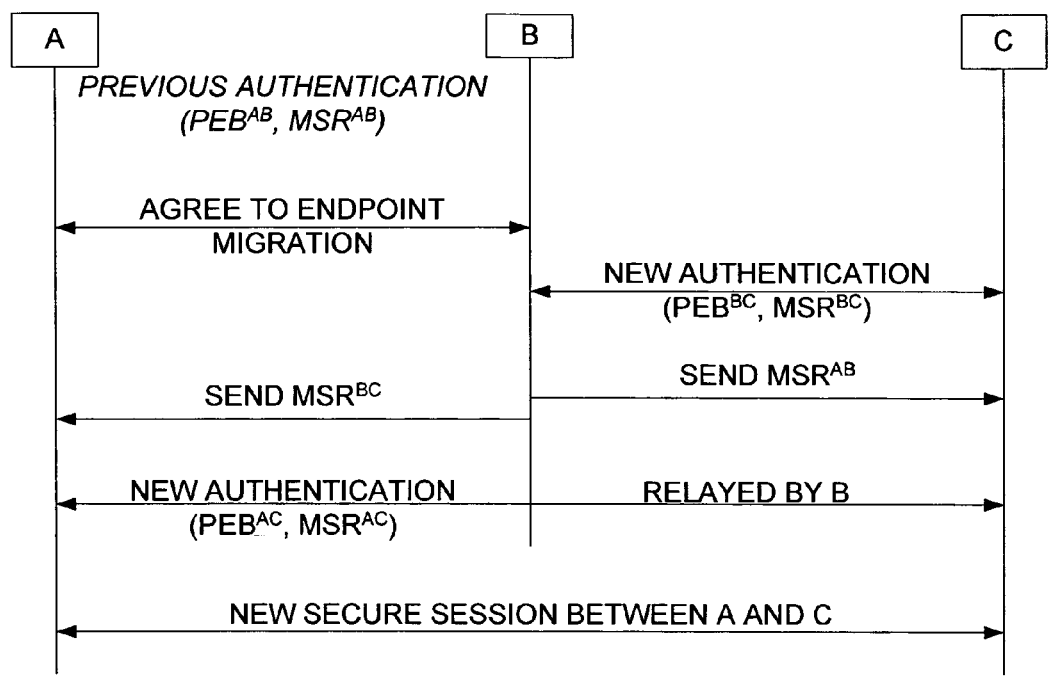
FIG. 7 is an example illustration of an associated protocol extension for a protocol endpoint migration.

FIG. 7 illustrates an example protocol endpoint migration from endpoint B to endpoint C. The example endpoint migration of FIG. 7 starts with an established secure connection between endpoints A and B (i.e., $PEB^{AB}$) based on a master secret $MSR^{AB}$. The $MSR^{AB}$ is communicated to endpoint C by endpoint B by establishing a second session (i.e., $PEB^{BC}$) between endpoints B and C that results in $MSR^{BC}$. The $MSR^{BC}$ is communicated to endpoint A by endpoint B allowing endpoint A to be convinced that there is no man-in-the-middle between endpoints B and C. The SPE 200 (i.e., endpoint A) and endpoint C create a third session (i.e., $PEB^{AC}$) using endpoint B to relay messages between endpoints A and C. Endpoints A and C determine a new master secret $MSR^{AC}$ based on, among other things, $MSR^{AB}$ and $MSR^{BC}$. For example, $MSR^{AC}$ could be determined using a PRF to combine the $MSR^{AC}$, a cryptographic hash of the messages exchanged between A and C, and the $MSR^{AB}$. The $MSR^{AB}$ and $MSR^{BC}$ represent a cryptographic binding between the associated endpoints. By including the $MSR^{AB}$, the connection between endpoints A and C is associated to and extended from the secure connection between endpoints A and B.

A history of exchanged messages (e.g., for $PEB^{AB}$, $PEB^{AC}$, $PEB^{BC}$) (possibly containing specific identification, authentication and authorization/attestation information) can be held in a repository that can be queried by endpoint A or endpoint C to understand the security conditions of the endpointA-to-endpointB connection and/or the endpointB-to-endpointC connection. For example, when endpoint B sends $MSR^{BC}$ to endpoint A, a reference to the repository could be included. The $MSR^{AB}$, or a derivative key, could then be used to protect the repository link and associated references.

While the disclosed methods and apparatus discussed herein were described with respect to bi-directional authentications and peer-to-peer communications, it will be readily apparent to persons of ordinary skill in the art that the disclosed methods and apparatus apply equally to uni-direction authentication (i.e., authentication of only one endpoint), and master-slave and client-server communications. It will also be readily apparent to persons of ordinary skill in the art that the disclosed methods and apparatus discussed herein are not dependent upon the use of a particular packet processing technique (e.g., asynchronous, synchronous, isochronous), a framing format, a communication technique, a communication link, etc.

Figure 8:
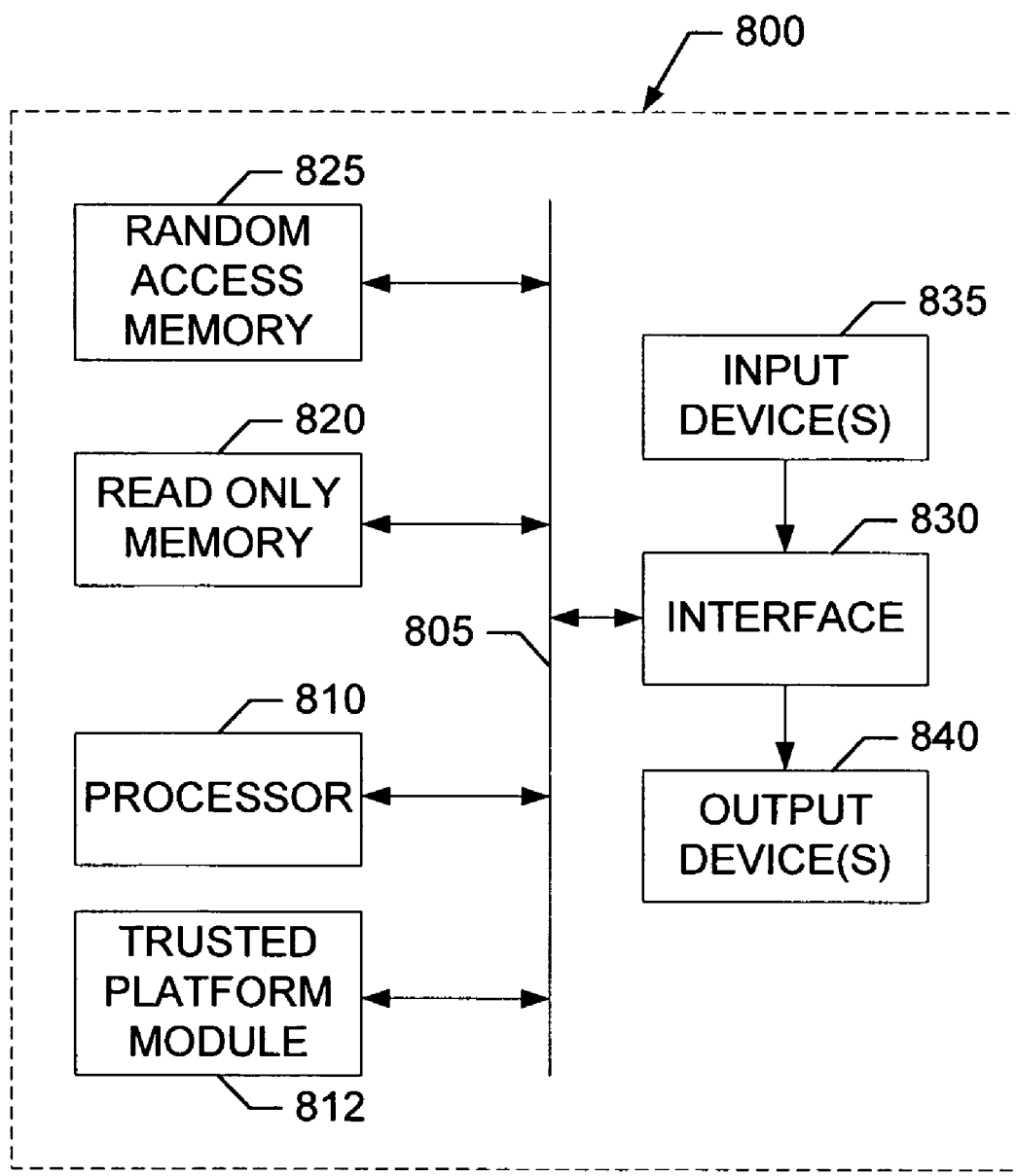
FIG. 8 is a schematic illustration of an example processor platform that may execute the example machine readable instructions represented by FIG. 3 or the example associated protocol extensions of FIGS. 4-7 to implement the security protocol extender of FIG. 2.

FIG. 8 is a schematic diagram of an example processor platform 800 capable of implementing the examples illustrated in FIGS. 3-7. For example, the processor platform 800 can be implemented by one or more general purpose microprocessors, microcontrollers, etc.

The processor platform 800 of the example of FIG. 8 includes a general purpose programmable processor 810. The processor 810 executes coded instructions present in main memory of the processor 810. The processor 810 may be any type of processing unit, such as a microprocessor from the Intel® Centrino® family of microprocessors, the Intel® Pentium® family of microprocessors, the Intel® Itanium® family of microprocessors, the Intel® XScale® family of processors, and/or the Intel® active management technology engine. The processor 810 may implement, among other things, the protocol processor 205, the message encrypter 220 and/or the message authenticator 240 of FIG. 2, and the examples illustrated in FIGS. 3-7.

The processor 810 is in communication with the main memory (including a read only memory (ROM) 820 and a RAM 825) via a bus 805. The RAM 825 may be implemented by Synchronous Dynamic Random Access Memory (SDRAM), Dynamic DRAM, and/or any other type of RAM device. The ROM 820 may be implemented by flash memory and/or any other desired type of memory device. Access to the memory space 820, 825 is typically controlled by a memory controller (not shown) in a conventional manner. The RAM 825 may be used to implement the protected storage device 210 of FIG. 2.

The processor platform 800 also includes a conventional interface circuit 830. The interface circuit 830 may be implemented by any type of interface standard, such as an external memory interface, serial port, general purpose input/output, etc.

One or more input devices 835 are connected to the interface circuit 830. The input devices 835 may be used to implement the message transmitter 225 of FIG. 2. One or more output devices 840 are also connected to the interface circuit 830. The output devices 840 may be used to implement the message receiver 235 of FIG. 2.

Of course, one of ordinary skill in the art will recognize that the order, size, and proportions of the memory illustrated in the example systems may vary. For example, the user/hardware variable space may be larger than the main firmware instructions space. Additionally, although this patent discloses example systems including, among other components, software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above described example systems, persons of ordinary skill in the art will readily appreciate that the examples are not the only way to implement such systems.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to extend a security protocol comprising:
    determining a first master secret for a first security protocol exchange between a first endpoint and a second endpoint;
    exchanging identifying information between the first endpoint and the second endpoint, wherein the exchanged identifying information does not include any encryption secret and does not include any encryption key;
    determining, using a processor, a first secret based on the exchanged identifying information;
    determining a second master secret for a second security protocol exchange based on the first secret and the first master secret;
    deriving a session key between the first and second endpoints based on the second master secret;
    exchanging second identifying information between the second and a third endpoint to determine a second secret, wherein the second master secret is also based on the second secret and cryptographically combines the first master secret, the first secret and the second secret; and
    configuring an encrypter at the first endpoint with the second master secret, the encrypter to encrypt data sent from the first endpoint to the second endpoint during the second security protocol exchange with the second master secret.

2. A method as defined in claim 1, wherein determining the second secret based on the second exchanged identifying information uses a cryptographic combination of the second exchanged identifying information.

3. A method as defined in claim 1, wherein the exchanged identifying information includes platform attestation information.

4. A method as defined in claim 1, wherein the identifying information of at least one of the endpoints is stored in a protected storage device.

5. A method as defined in claim 1, wherein determining the first secret based on the exchanged identifying information uses a cryptographic combination of the exchanged identifying information.

6. A method as defined in claim 5, wherein the cryptographic combination includes at least one of: (a) an arithmetic addition, (b) an exclusive-or, or (c) a cryptographic hash.

7. A method as defined in claim 1, wherein determining the second master secret based on the first secret and the first master secret comprises using a cryptographic combination of the first secret and the first master secret.

8. A method as defined in claim 7, wherein the cryptographic combination includes at least one of: (a) an arithmetic addition, (b) an exclusive-or, or (c) a cryptographic hash.

9. A method as defined in claim 1, wherein the second master secret is also based on second identifying information exchanged during the first security protocol exchange.

10. A method as defined in claim 1 wherein the exchanged identifying information comprises at least one of attestation information, an endpoint identifier, a credential, or a platform configuration register.

11. A machine readable storage medium, wherein the machine readable storage medium is not a signal, the machine readable storage medium comprising instructions which, when executed, cause a first endpoint device to, at least:
    determine a first master secret for a first security protocol exchange between a first endpoint device and a second endpoint device;
    exchange identifying information with the second endpoint device, wherein the exchanged identifying information does not include any encryption secret and does not include any encryption key;
    determine a first secret based on the exchanged identifying information;
    determine a second master secret based on the first secret and the first master secret;
    derive a session key for a second security protocol exchange between the first and second endpoint devices based on the second master secret;

derive a session key between the first and second endpoints based on the second master secret;

exchange second identifying information between the second and a third endpoint to determine a second secret, wherein the second master secret is also based on the second secret and cryptographically combines the first master secret, the first secret and the second secret; and configure an encrypter at the first endpoint with the session key, the encrypter to encrypt data sent from the first endpoint to the second endpoint during the second security protocol exchange with the session key.

12. A machine readable storage medium as defined in claim 11, wherein the machine readable instructions, when executed, cause the first endpoint device to determine the first secret based on the exchanged identifying information using a cryptographic combination of the exchanged identifying information.

13. A machine readable storage medium as defined in claim 11, wherein the second master secret is also based on second identifying information exchanged during the first security protocol exchange.

14. A machine readable storage medium as defined in claim 11, wherein the exchanged identifying information comprises at least one of attestation information, an endpoint identifier, a credential, or a platform configuration register.

15. An apparatus to authenticate a first endpoint comprising a message handler to:
exchange identifying information between the first endpoint and a second endpoint, wherein the exchanged identifying information does not include any encryption secret and does not include any encryption key; and
exchange data between the first and second endpoints based on a session key; and a protocol processor to:
determine a first master secret for a first security protocol exchange between the first and second endpoints;
determine a first secret based on the exchanged identifying information;
determine a second master secret based on the first secret and the first master secret determined in the first security protocol exchange;
derive a session key between the first and second endpoints based on the second master secret;
exchange second identifying information between the second and a third endpoint to determine a second secret, wherein the second master secret is also based on the second secret; and
cryptographically combine the first master secret, the first secret and the second secret, wherein at least one of the message handler or the protocol processor is implemented in hardware.

16. An apparatus as defined in claim 15 further comprising a protected storage device to store the identifying information of the first endpoint.

17. An apparatus as defined in claim 16, wherein the protected storage device is a trusted platform module.

18. An apparatus as defined in claim 15, wherein the protocol processor comprises an active management technology engine.

19. An apparatus as defined in claim 15, wherein the protocol processor is to determine the first secret based on the exchanged identifying information using a cryptographic combination of the exchanged identifying information.

20. An apparatus as defined in claim 15, wherein the second master secret is also based on second identifying information exchanged during the first security protocol exchange.

21. An apparatus as defined in claim 15, wherein the message handler comprises:
a message encrypter;
a message transmitter;
a message receiver; and
a message authenticator.

* * * * *